(12) United States Patent
Yui et al.

(10) Patent No.: US 11,433,582 B2
(45) Date of Patent: Sep. 6, 2022

(54) MOLD FOR MOLDING BASE MATERIAL INTEGRATED GASKET

(71) Applicant: NOK CORPORATION, Tokyo (JP)

(72) Inventors: Hajime Yui, Kanagawa (JP); Kenichi Oba, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 211 days.

(21) Appl. No.: 17/043,946

(22) PCT Filed: Nov. 22, 2019

(86) PCT No.: PCT/JP2019/045847
§ 371 (c)(1),
(2) Date: Sep. 30, 2020

(87) PCT Pub. No.: WO2020/149010
PCT Pub. Date: Jul. 23, 2020

(65) Prior Publication Data
US 2021/0206038 A1  Jul. 8, 2021

(30) Foreign Application Priority Data

Jan. 18, 2019  (JP) .............................. JP2019-007155

(51) Int. Cl.
*B29C 45/14*  (2006.01)
*B29L 31/34*  (2006.01)

(52) U.S. Cl.
CPC . *B29C 45/14336* (2013.01); *B29L 2031/3468* (2013.01)

(58) Field of Classification Search
CPC .......... B29D 99/0053; B29C 45/14336; B29C 70/74; B29C 70/78; B29L 2031/3468
See application file for complete search history.

(56) References Cited

U.S. PATENT DOCUMENTS

| | | | |
|---|---|---|---|
| 2009/0148748 A1 | 6/2009 | Okonogi et al. | |
| 2011/0033781 A1* | 2/2011 | Chin | B29C 45/14778 429/510 |
| 2018/0186047 A1* | 7/2018 | Masaka | B29C 45/14336 |

FOREIGN PATENT DOCUMENTS

| | | | | |
|---|---|---|---|---|
| CA | 2636055 C | * | 3/2011 | .......... H01M 8/0267 |
| CN | 204431641 | | 7/2015 | |

(Continued)

OTHER PUBLICATIONS

Official Communication issued in International Patent Application No. PCT/JP2019/045847, dated Feb. 4, 2020, along with an English translation thereof.

(Continued)

*Primary Examiner* — Robert B Davis
(74) *Attorney, Agent, or Firm* — Greenblum & Bernstein, P.L.C.

(57) ABSTRACT

A base-material/gasket unit mold which can reduce molding failure occurrence is provided. The mold includes a first half mold including a base material holding portion arranged on a first parting surface to hold a base material, and a second half mold having a second parting surface and used together with the first half mold to close and open the mold. The second half mold includes a gasket cavity defined on the second parting surface side to form a gasket main body on a surface of the base material, an isolated rubber cavity forming an isolated rubber portion isolated from the gasket main body on the surface of the base material, and a mold-pressing portion arranged around the isolated rubber cavity to press the base material when the mold is closed and having a recessed part defined on a press surface side to reduce deformation of the base material.

2 Claims, 5 Drawing Sheets

(56) References Cited

FOREIGN PATENT DOCUMENTS

| | | |
|---|---|---|
| CN | 107208797 | 9/2017 |
| JP | 2002-231274 | 8/2002 |
| JP | 2005-153217 | 6/2005 |
| JP | 2009-158481 | 7/2009 |
| JP | 2011-28939 | 2/2011 |

OTHER PUBLICATIONS

Chinese Official Action for related Chinese patent application No. 201980016678.X dated Oct. 9, 2021.

\* cited by examiner

MOLD FOR MOLDING BASE MATERIAL INTEGRATED GASKET

FIELD

The present disclosure relates to a mold to be used to mold a base-material/gasket unit.

BACKGROUND

A base-material/gasket unit to be arranged in a fuel cell as one of its components is integrally constructed of a base material which is formed of a resin film, a gasket main body which is formed on a surface of the base material by injection molding, and isolated rubber portions which are formed on the surface of the base material by injection molding (see Japanese Patent Laid-Open Publication No. 2002-231274, for example).

The isolated rubber portions guide flows of a fluid such as fuel gas or cooling water to facilitate smooth flows from a manifold portion to a fuel cell reaction portion and from the fuel cell reaction portion to the manifold portion.

BRIEF SUMMARY

Technical Problem

The base-material/gasket unit is formed by inserting the base material of a resin film as an insert by using an injection mold.

However, in the case in which the base-material/gasket unit is formed by using a typical injection mold, the base material may partially be deformed, more specifically bulge toward the isolated rubber portions to a large extent. As a result, the isolated rubber portions may be formed on the surface of the deformed base material. Such deformation may cause molding failure to be eliminated.

It is an object of the present disclosure to provide a base-material/gasket unit mold which can reduce molding failure occurrence.

Solution to Problem

A base-material/gasket unit mold according to the present disclosure includes a first half mold including a base material holding portion arranged on a first parting surface to hold a base material; and a second half mold having a second parting surface, the second half mold used together with the first half mold to close and open the mold of first and second half molds, the second half mold including a gasket cavity defined on the second parting surface side to form a gasket main body on a surface of the base material, an isolated rubber cavity defined on the second parting surface side to form an isolated rubber portion isolated from the gasket main body on the surface of the base material, and a mold-pressing portion arranged around the isolated rubber cavity to press the base material when the mold is closed, the mold-pressing portion having a recessed part defined on a press surface side to reduce deformation of the base material.

Advantageous Effects

According to a base-material/gasket unit mold of the present disclosure, molding failure occurrence can be reduced.

DETAILED DESCRIPTION

Figure 1:
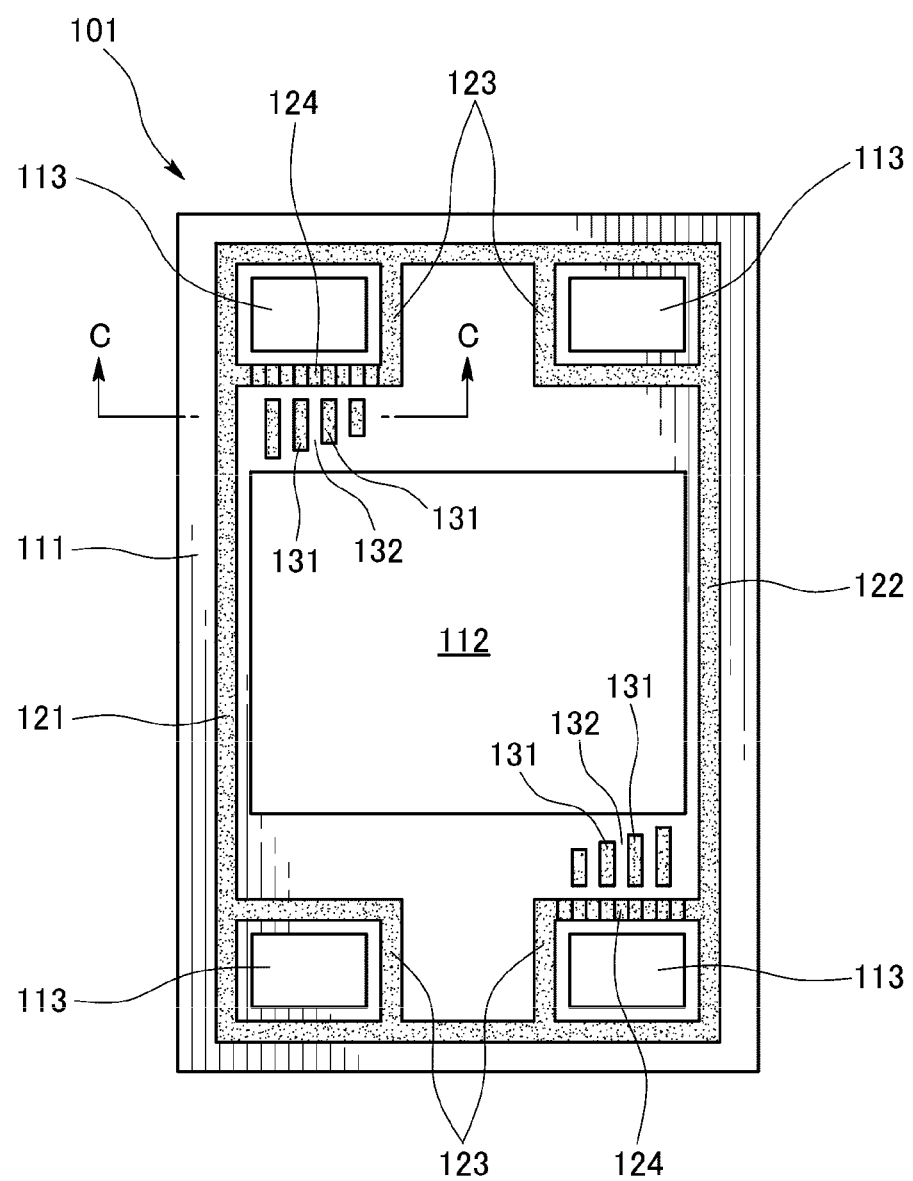
FIG. 1 is a plan view entirely showing a base-material/gasket unit.
Figure 2:
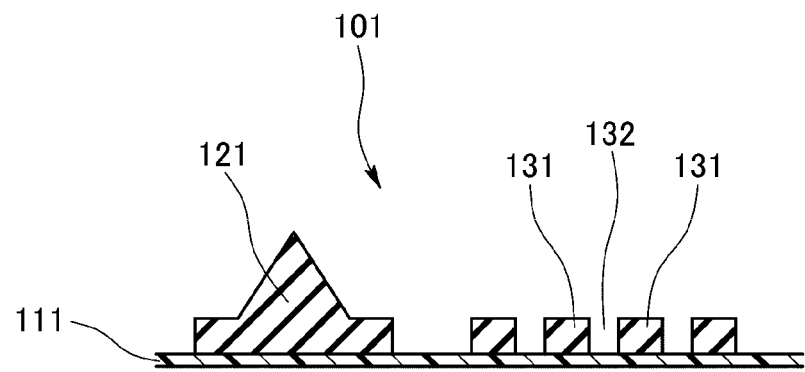
FIG. 2 is an enlarged cross-sectional view taken along the line C-C in FIG. 1.

A base-material/gasket unit mold according to an embodiment is used to form a base-material/gasket unit 101 shown in FIGS. 1 and 2.

The base-material/gasket unit 101 includes a base material 111, a gasket main body 121, and isolated rubber portions 131. The gasket main body 121 and the isolated rubber portions 131 are formed on a surface of the base material 111 by injection molding. The base-material/gasket unit 101 is integrally constructed of the base material 111, the gasket main body 121, and the isolated rubber portions 131. The base material 111 is formed of a resin film. The gasket main body 121 is formed on the surface of the base material 111 by injection molding. The isolated rubber portions 131 are formed on the surface of the base material 111 by injection molding.

The base material 111 is formed of a resin film having a flat rectangular shape. The base material 111 has a hollow portion (cut-out portion) 112 in the central part of the surface. A fuel cell reaction portion will be arranged in the hollow portion 112 when cells are assembled. The base material 111 has hollow portions (cut-out portions) 113 in the four corner parts of the surface. The hollow portions 113 will serve parts of manifold paths when cells are assembled. Exemplary materials of the resin film can be provided by PEN (polyethylene naphthalate), PP (polypropylene), PPSU (polyphenylsulfone), PA (polyamide), and SPS (syndiotactic polystyrene).

The gasket main body 121 includes an exterior-side gasket main portion 122 and interior-side gasket main portions 123. The exterior-side gasket main portion 122 has a rectangular frame shape. The exterior-side gasket main portion 122 surrounds the fuel cell reaction portion (hollow portion 112) to prevent leakage of a fluid such as fuel gas or cooling water which is supplied to the fuel cell reaction portion in operation of the fuel cell from the cell. The interior-side gasket main portions 123 separate the fuel cell reaction portion (hollow portion 112) from the manifold paths (hollow portions 113).

The interior-side gasket main portions 123 have a notched opening 124.

The isolated rubber portions 131 serve as a guide or rectifier which facilitates smooth flows of a fluid such as fuel gas or cooling water from the hollow portion 113 to the hollow portion 112 and from the hollow portion 112 to the hollow portion 113 through the openings 124.

As illustratively shown in FIG. 1, a plurality (e.g., four) of isolated rubber portions 131 having a different length are aligned parallel to each other. The isolated rubber portions 131 are positioned on the hollow portion 112 side relative to the opening 124. Groove-shaped flow passages 132 are formed between the isolated rubber portions 131 adjacent to each other. The flow passages 132 are aligned on lines which extend from notches of the opening 124.

As a result, the fluid such as fuel gas can smoothly flow from the hollow portion 113 through the opening 124 and the flow passages 132 into the hollow portion 112. Also, the fluid can smoothly flow from the hollow portion 112 through the flow passages 124 and the opening 132 into the hollow portion 113.

Exemplary rubber materials which form the gasket main body 121 and the isolated rubber portions 131 can be provided by VMQ (vinylmethyl silicone rubber), EPDM (ethylene propylene rubber), and PIB (polyisobutylene). Also, adhesive rubber materials may be used to form the gasket main body 121 and the isolated rubber portions 131.

The base-material/gasket unit 101 is formed by inserting the base material 111 of a resin film as an insert by using an injection mold.

Figure 3A:
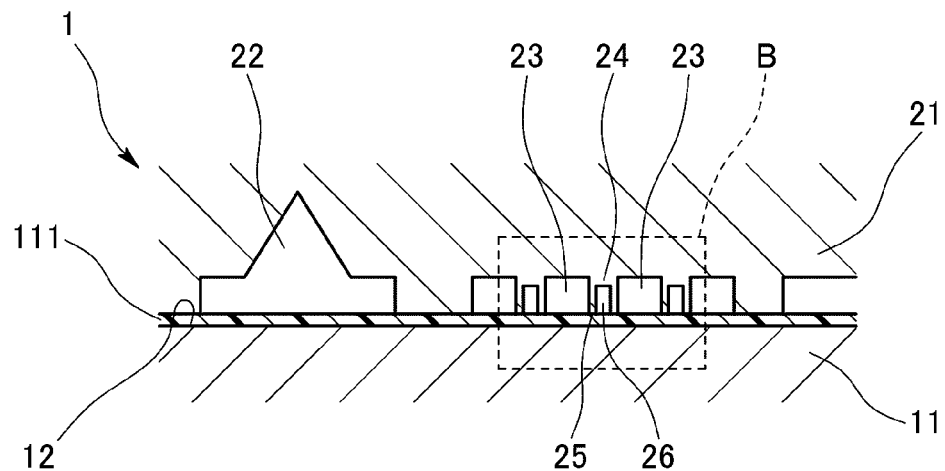
FIG. 3A is a cross-sectional view of a principal part of a mold according to an embodiment.
Figure 3B:
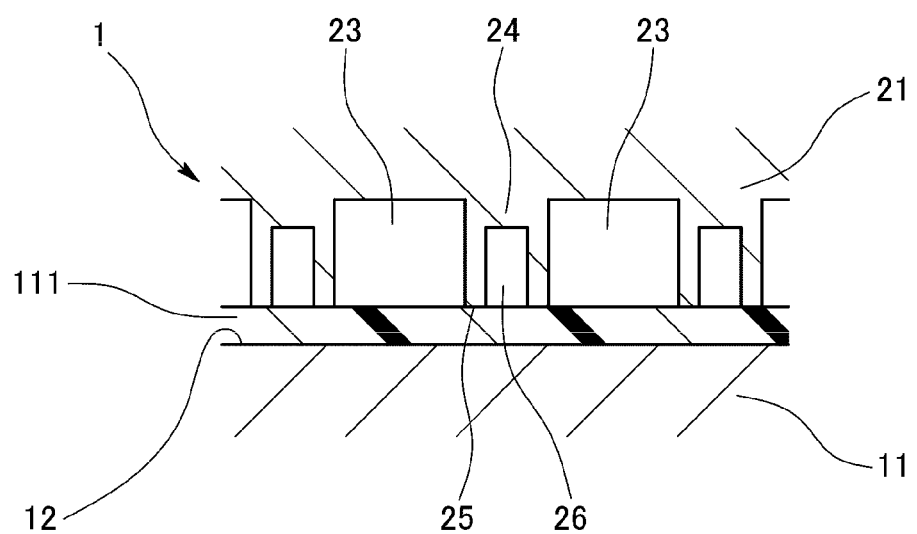
FIG. 3B is an enlarged view of the part B in FIG. 3A.

As shown in FIGS. 3A and 3B, an injection mold 1 includes a first half mold 11 and a second half mold 21. The first half mold 11 and the second half mold 21 are paired with each other, and used together to close and open the mold of first and second half molds.

A base material holding portion 12 is arranged on a parting surface of the first half mold 11 (first parting surface). The base material holding portion 12 holds the base material 111 as an insert in place.

A gasket cavity 22 and isolated rubber cavities 23 are defined on a parting surface side of the second half mold 21 (second parting surface). The gasket main body 121 is formed on the surface of the base material 111 by the gasket cavity 22. The isolated rubber portions 131, which are isolated from the gasket main body 121, are formed on the surface of the base material 111 by the isolated rubber cavities 23. The molding rubber material is injected into the cavities 22 and 23 through sprues and gates (not shown) so that the gasket body 121 and the isolated rubber portions 131 are formed.

In addition, mold-pressing portions 24 are arranged on the parting surface of the second half mold 21. The mold-pressing portions 24 are arranged on the periphery of their corresponding isolated rubber cavity 23, and press the base material 111 when the mold is closed. A recessed part 26 for reducing deformation of the base material is defined as retracted part in a press surface 25 of the mold-pressing portion 24.

More specifically, in the base-material/gasket unit 101 shown in FIGS. 1 and 2, a plurality (e.g., four) of isolated rubber portions 131 are aligned parallel to each other. To form this arrangement, a plurality (e.g., four) of isolated rubber cavities 23 for forming the isolated rubber portions 131 are aligned parallel to each other for each set of isolated rubber portions. In this embodiment, the mold-pressing portions 24 are arranged between the isolated rubber cavities 23 adjacent to each other. Accordingly, the recessed part 26 is arranged in the press surface 25 of the mold-pressing portion 24. In this embodiment, the recessed parts 26 are aligned as straight grooves parallel to the isolated rubber cavities 23.

Figure 4A:
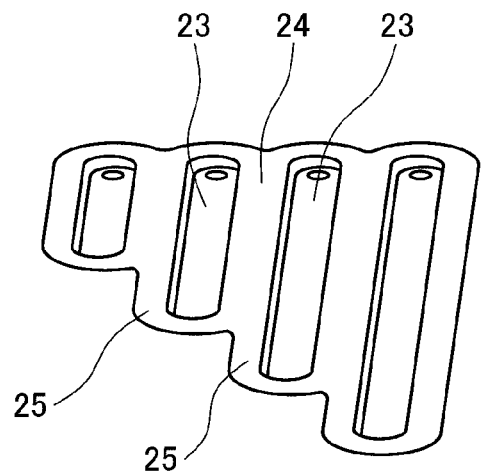
FIG. 4A is a perspective view of a mold-pressing portion of a comparative example.
Figure 4B:
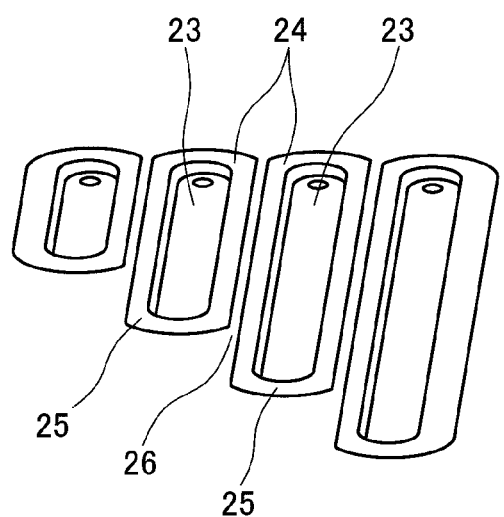
FIG. 4B is a perspective view of mold-pressing portions according to the embodiment.

A continuous mold-pressing portion 24 of a comparative example shown in FIG. 4A entirely surrounds isolated rubber cavities 23 so that the isolated rubber portions 131 are formed by the isolated rubber cavities 23. Contrary to this, in the mold-pressing portions 24 according to the embodiment shown in FIG. 4B, the recessed parts 26 are aligned as straight grooves parallel to the isolated rubber cavities 23 in the press surfaces 25 of the mold-pressing portions 24. In other words, the mold-pressing portions 24 independently surround their corresponding isolated rubber cavity 23.

In molding procedure, the base material 111 of a film is first placed onto the base material holding portion 12 which is arranged in the parting surface of the first half mold 11 in the opened mold. Subsequently, the mold is closed. Subsequently, the rubber material is injected into the cavities 22 and 23 so that the gasket main body 121 and the isolated rubber portions 131 are formed. After the molding is completed, the mold is opened so that the molded article is removed from the mold.

The mold 1 according to the embodiment which has the recessed parts 26 in the press surfaces 25 of the mold-pressing portions 24 can provide the following operation/working-effects.

Figure 5A:
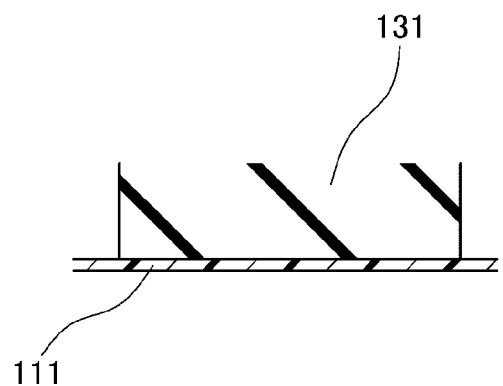
FIG. 5A is a cross-sectional view showing a principal part of the base-material/gasket unit.
Figure 5B:
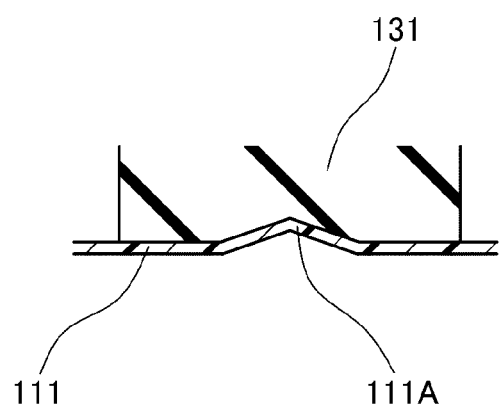
FIG. 5B is a cross-sectional view showing a principal part of a base-material/gasket unit when failure occurs.

In the case in which the base-material/gasket unit 101 is formed by using the mold 1, the desirable isolated rubber portions 131 can be formed on the flat surface of the base material 111 without deformation by injection molding as shown in FIG. 5A. If the recessed part 26 is not defined in the press surface 25 of the mold-pressing portion 24, the base material 111 may partially be deformed, more specifically bulge toward the isolated rubber portion 131 to a large extent when subjected to high temperature in the molding so that a deformed part 111A appears as shown in FIG. 5B. In a case in which the isolated rubber portion 131 is formed on a surface of the deformed part 111A, molding failure to be eliminated may occur.

To address this, the mold 1 according to the embodiment has the recessed parts 26 in the press surfaces 25 of the mold-pressing portions 24. Accordingly, the base material 111 can be deformed not only in the part that faces the isolated rubber cavity 23 but also in the part that faces the recessed part 26. As a result, the base material 111 can be deformed both in the part that faces the isolated rubber cavity 23 and in the part that faces the recessed part 26, that is, the deformation of the base material 111 can be dispersed. Correspondingly, a deformation extent in the part that faces the isolated rubber cavity 23 can be reduced. Therefore, such a large extent of bulging deformation of the base material 111 toward the isolated rubber portion 131 can be reduced in the molding. Consequently, molding failure occurrence can be reduced.

In addition, a plurality of isolated rubber cavities 23 are defined, and the recessed part 26 is arranged in the press surface 25 of the mold-pressing portion 24 arranged between the plurality of isolated rubber cavities 23. For this reason, one recessed part 26 can reduce deformation of the base material 111 which may occur both in two isolated rubber cavities 23 which are located on the both sides of the recessed part 26.

REFERENCE SIGNS LIST

1 . . . Mold
11 . . . First Half Mold
21 . . . Second Half Mold
12 . . . Base Material Holding Portion
22 . . . Gasket Cavity
23 . . . Isolated Rubber Cavity
24 . . . Mold-Pressing Portion
25 . . . Press Surface
26 . . . Recessed Part
101 . . . Base-Material/Gasket Unit
111 . . . Base Material
112,113 . . . Hollow Portion
121 . . . Gasket Main Body
122 . . . Exterior-Side Gasket Main Portion
123 . . . Interior-Side Gasket Main Portion
124 . . . Opening
131 . . . Isolated Rubber Portion
132 . . . Flow Passage

The invention claimed is:

1. A base-material/gasket unit mold comprising:
a first half mold including a base material holding portion arranged on a first parting surface to hold a base material; and
a second half mold having a second parting surface, the second half mold used together with the first half mold to close and open the mold of first and second half molds, the second half mold including
a gasket cavity defined on the second parting surface side to form a gasket main body on a surface of the base material,
an isolated rubber cavity defined on the second parting surface side to form an isolated rubber portion isolated from the gasket main body on the surface of the base material, and
a mold-pressing portion arranged around the isolated rubber cavity to press the base material when the mold is closed, the mold-pressing portion having a recessed part defined on a press surface side to reduce deformation of the base material.

2. The base-material/gasket unit mold according to claim 1, wherein
the second half mold includes a plurality of the isolated rubber cavities, and
the recessed part is arranged between the plurality of isolated rubber cavities adjacent to each other on the press surface side of the mold-pressing portion.

* * * * *